March 9, 1943.    R. A. GOEPFRICH    2,313,431
BRAKE
Filed Oct. 10, 1940

INVENTOR.
RUDOLPH A. GOEPFRICH
BY M. W. McConkey
ATTORNEY.

Patented Mar. 9, 1943

2,313,431

UNITED STATES PATENT OFFICE 2,313,431

BRAKE

Rudolph A. Goepfrich, South Bend, Ind., assignor to Bendix Aviation Corporation, South Bend, Ind., a corporation of Delaware Application October 10, 1940, Serial No. 360,566
In Great Britain April 8, 1940

7 Claims. (Cl. 188—152)

This invention relates to brakes, and is illustrated as embodied in an internal expanding automobile brake.

An object of the invention is to provide the brake or its equivalent with improved wheel-cylinder fluid motors arranged to take the torque of the brake shoes, and which form sealed units from which all foreign matter is excluded. To this end each cylinder is provided with end caps which seat on the ends of the cylinder and which have peripheral flanges closely encircling the ends of the cylinder, the caps preferably being kept from binding on the cylinder by central cylindrical extensions which engage and are piloted in recesses in the pistons inside the cylinder.

Another object of the invention is to secure maximum effectiveness of the brake shoes in forward braking, while still providing adequate braking in reverse, by shifting the cylinder-anchor assemblies along chords of the brake drum so that one end of each shoe anchors nearer the center of the drum than the other end.

Other objects and features of the invention, including various novel combinations of parts and desirable improved constructions, especially certain improvements relating to the wear adjustment, will be apparent from the following description of the illustrative embodiment shown in the accompanying drawing in which.

Figure 1:
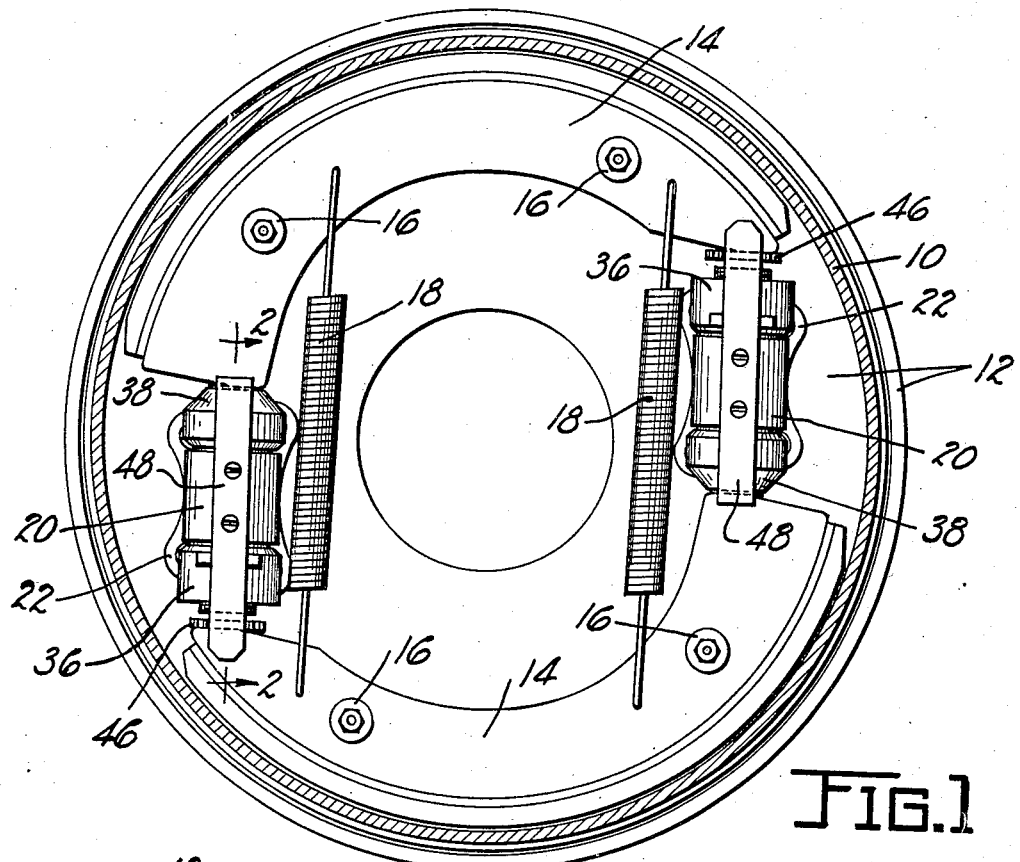
Figure 1 is a section through the brake, just inside the head of the brake drum, with the brake shoes in side elevation.
Figure 2:
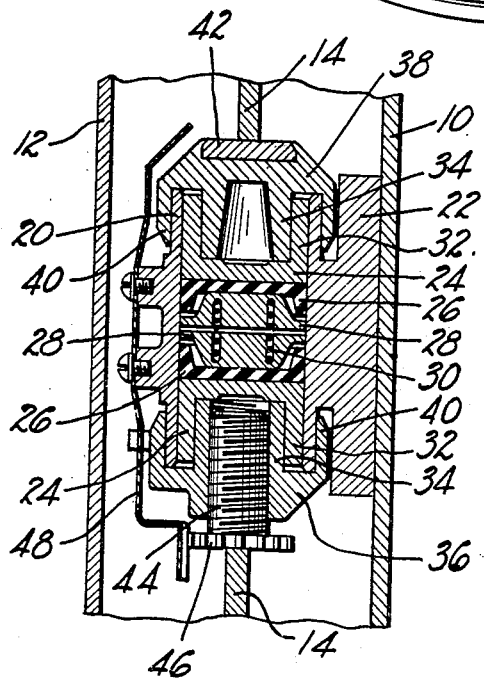
Figure 2 is a partial section on the line 2—2 of Figure 1.

The particular brake selected for illustration includes a drum 10, at the open side of which is a support such as a backing plate 12, and within which are a pair of individually shiftable brake shoes 14 provided with steady rests 16 and return springs 18.

The shoes are actuated, and anchor against, two wheel-cylinder fluid motor assemblies at opposite sides of the brake. Each of these assemblies includes a double-ended straight-bore cylinder 20, shown cast or otherwise formed integral with a bracket 22 bolted or secured in any desired manner to the backing plate 12.

Within each cylinder are a pair of pistons 24, faced with sealing cups 26 of rubber material, and between which are a pair of spacer blocks 28 urged apart against the pistons by a spring 30. The cylinders have the usual inlet and bleeder connections (not shown). The spacer blocks 28 insure that, even when the cylinders are arranged vertically as shown, the cylinders can be bled so completely that no substantial amount of air remains trapped therein.

The pistons 24 are formed with cylindrical flanges 32, forming outwardly-directed cylindrical recesses within which are piloted cylindrical extensions 34 of end caps 36 and 38 which seat against the ends of the cylinders 20 and which serve to transmit the braking torque of shoes 14. Extensions 34 also seat at their ends against the pistons 24, so that they serve to transmit brake-applying force from the pistons to the shoes.

The end caps 36 and 38 are formed with peripheral flanges 40 closely encircling and telescopically embracing the ends of the cylinders 20, and serving to exclude foreign matter from the cylinder without the use of boots or the like. The flanges 40 are prevented from binding on the cylinders by the extensions 34, which prevent any cocking of the end caps.

The end caps 38 are provided with hardened inserts 42 engaged by the corresponding ends of the shoes, and the caps 36 have adjustably threaded therein wear adjusting members 44 formed with heads 46 engaged by the other ends of the shoes. Members 44 are yieldingly locked by engagement, with the serrated edges of heads 46, of the ends of leaf springs 48 carried by the cylinders 20. The other ends of springs 48 are bent over into the path of movement of caps 38, preventing these caps from coming off the cylinders unintentionally during assembly, etc.

It will be noted, in Figure 1, that the cylinder assemblies are not centered along the chords of the drum on which they are arranged, but are shifted toward the toes of the shoes which anchor on them. This permits the heels of the shoes (i. e., the ends which anchor in normal forward braking) to anchor nearer the center of the drum than would be possible if the cylinders were centered, thereby accentuating the self-energizing action of the shoes in forward braking, without requiring any added clear space at the center of the brake.

This makes it necessary to have the toes of the shoes engage the cylinder assemblies further from the center of the brake than the heels of the shoes do, thus reducing the self-energization in reverse braking. However, adequate braking still remains for the lower speeds at which reverse braking takes place.

While one illustrative embodiment has been described in detail, it is not my intention to limit the scope of the invention to that particular embodiment, or otherwise than by the terms of the appended claims.

I claim:

1. For use in a hydraulic brake having a brake drum, a support member and a shoe mounted on the support member, a fluid motor for moving the shoe against the drum comprising a cylinder having a pair of pistons therein, spacer blocks between and yieldingly pressed outwardly against said pistons, caps fitting over and having peripheral flanges closely encircling the ends of the cylinder and which have central cylindrical extensions engaging said pistons respectively, one of said caps having a hardened thrust block on its outer face and the other having an adjusting member mounted therein, and a spring mounted on the cylinder and one end of which yieldingly locks the adjusting member and the other end of which extends inwardly into the path of movement of said one cap and prevents it coming off the cylinder.

2. In combination with a brake having a brake shoe, a fluid motor for actuating the shoe comprising a cylinder having a pair of pistons therein formed with recesses in their outer faces, and caps fitting over and having peripheral flanges closely encircling the ends of the cylinder and which have central cylindrical extensions piloted in said recesses and engaging said pistons respectively, one of said caps having a hardened thrust block on its outer face and the other having an adjusting member mounted therein.

3. In a brake, the combination of a brake drum and a friction element with a fluid motor for moving the friction element into contact with the drum comprising a cylinder having a pair of pistons therein formed with recesses in their outer faces, and caps fitting over and having peripheral flanges closely encircling the ends of the cylinder and which have central cylindrical extensions piloted in said recesses and engaging said pistons respectively, one of said caps having a hardened thrust block on its outer face and the other having an adjusting member mounted therein, and a spring mounted on the cylinder and one end of which yieldingly locks the adjusting member.

4. A fluid motor comprising a cylinder having a pair of pistons therein formed with recesses in their outer faces, caps fitting over and having peripheral flanges closely encircling the ends of the cylinder and which have central cylindrical extensions piloted in said recesses and engaging said pistons respectively, one of said caps being provided with adjusting means, and resilient means for preventing the caps from coming off the cylinder during outward movement of the pistons.

5. In combination with a brake having a brake shoe, a fluid motor for actuating the shoe comprising a cylinder having a pair of pistons therein formed with recesses in their outer faces, spacer blocks between and yieldingly pressed outwardly against said pistons, and caps fitting over and having peripheral flanges closely encircling the ends of the cylinder and which have central cylindrical extensions piloted in said recesses and engaging said pistons respectively, one of said caps having a hardened thrust block on its outer face and the other having an adjusting member mounted therein.

6. In combination with a brake having a brake shoe, a fluid motor for actuating the shoe comprising a cylinder having a pair of pistons therein formed with recesses in their outer faces, spacer blocks between and yieldingly pressed outwardly against said pistons, and caps fitting over and having peripheral flanges closely encircling the ends of the cylinder and which have central cylindrical extensions piloted in said recesses and engaging said pistons respectively.

7. For use in a hydraulic brake having a brake drum, a support member and a shoe mounted on the support member, a fluid motor for moving the shoe against the drum comprising a cylinder having a pair of pistons therein, caps fitting over and having peripheral flanges closely encircling the ends of the cylinder and which have central cylindrical extensions engaging said pistons respectively, one of said caps having a hardened thrust block on its outer face and the other having an adjusting member mounted therein, and a spring mounted on the cylinder and one end of which yieldingly locks the adjusting member and the other end of which extends inwardly into the path of movement of said one cap and prevents it coming off the cylinder.

RUDOLPH A. GOEPFRICH.